United States Patent
Rodrigues Dos Santos Guerrinha et al.

(10) Patent No.: US 12,452,566 B2
(45) Date of Patent: Oct. 21, 2025

(54) METHOD FOR CONFIGURING A FTTH DISTRIBUTION NETWORK CELL

(71) Applicant: ALTICE LABS, S.A., Aveiro (PT)

(72) Inventors: João Tiago Rodrigues Dos Santos Guerrinha, Aveiro (PT); Ricardo Nuno Vicente Cadime, Aveiro (PT); Pedro Antero Nunes De Sousa Pires Carvalhido, Aveiro (PT); Manuel Agostinho Oliveira Romeiro, Aveiro (PT)

(73) Assignee: ALTICE LABS, S.A., Aveiro (PT)

( * ) Notice: Subject to any disclaimer, the term of this patent is extended or adjusted under 35 U.S.C. 154(b) by 315 days.

(21) Appl. No.: 18/266,146

(22) PCT Filed: Nov. 22, 2021

(86) PCT No.: PCT/IB2021/060802
§ 371 (c)(1),
(2) Date: Jun. 8, 2023

(87) PCT Pub. No.: WO2022/130068
PCT Pub. Date: Jun. 23, 2022

(65) Prior Publication Data
US 2024/0048879 A1   Feb. 8, 2024

(30) Foreign Application Priority Data

Dec. 17, 2020 (PT) .................................. 116955

(51) Int. Cl.
*H04B 10/00* (2013.01)
*H04Q 11/00* (2006.01)

(52) U.S. Cl.
CPC . *H04Q 11/0067* (2013.01); *H04Q 2011/0086* (2013.01)

(58) Field of Classification Search
CPC ......... H04Q 11/0067; H04Q 2011/0086; H04J 14/00
See application file for complete search history.

(56) References Cited

U.S. PATENT DOCUMENTS

2020/0267580 A1* 8/2020 Gray ................... H04W 64/003
2024/0048879 A1* 2/2024 Rodrigues Dos Santos Guerrinha .......... H04Q 11/0067

* cited by examiner

*Primary Examiner* — Agustin Bello
(74) *Attorney, Agent, or Firm* — ArentFox Schiff LLP

(57) ABSTRACT

The present invention provides a new method to optimize the number of required OLT GPON ports, according to the growing customer penetration rate, when deploying FTTH in low density residential and SMB areas. Additionally, it enables to minimize simultaneous customer service outages in the same zone or MDU if a distribution cell splitter fails. This method presents a new connectivity paradigm at FTTH distribution network cells based on cross-connecting the fibres between ODPs and the OSJ splitters outputs. The method spreads each splitter coverage across the cell and guarantees a fair distribution of the outputs by as many ODPs as possible, following FTTH design best practices. This approach assures that the lowest splitters will be used first and enables the optimization of GPON ports at the central office, depending on the customer penetration rate.

6 Claims, 4 Drawing Sheets

| Customers | Fibers connected OSJ-ODP | Penetration Ratio |
|---|---|---|
| 1 | 1 | 100.0% |
| 2 | 1 | 50.0% |
| 3 | 2 | 66.7% |
| 4 | 3 | 75.0% |
| 5 | 3 | 60.0% |
| 6 | 4 | 66.7% |
| 7 | 5 | 71.4% |
| 8 | 6 | 75.0% |
| 9 | 6 | 66.7% |
| 10 | 7 | 70.0% |
| 11 | 8 | 72.7% |
| 12 | 8 | 66.7% |
| 13 | 9 | 69.2% |
| 14 | 10 | 71.4% |
| 15 | 10 | 66.7% |
| 16 | 11 | 68.8% |
| 17 | 12 | 70.6% |
| 18 | 12 | 66.7% |
| 19 | 13 | 68.4% |
| 20 | 14 | 70.0% |
| 21 | 15 | 71.4% |
| 22 | 15 | 68.2% |
| 23 | 16 | 69.6% |
| 24 | 17 | 70.8% |
| 25 | 17 | 68.0% |
| 26 | 18 | 69.2% |
| 27 | 19 | 70.4% |
| 28 | 20 | 71.4% |
| 29 | 20 | 69.0% |
| 30 | 21 | 70.0% |
| 31 | 22 | 71.0% |
| 32 | 22 | 68.8% |

Figure 3

| # ODPs | Number of fibres connected to ODP ||||||
|---|---|---|---|---|---|---|
| | 4 | 8 | 12 | 16 | 24 | 32 |
| 1 | 4 | 8 | 12 | 16 | 24 | 32 |
| 2 | 4 | 8 | 12 | 16 | 24 | 32 |
| 3 | 4 | 8 | 12 | 16 | 16 | |
| 4 | 4 | 8 | 12 | 16 | | |
| 5 | 4 | 8 | 12 | | | |
| 6 | 4 | 8 | 4 | | | |
| 7 | 4 | | | | | |
| 8 | 4 | | | | | |
| 9 | 4 | | | | | |
| 10 | 4 | | | | | |
| 11 | 4 | | | | | |
| 12 | 4 | | | | | |
| 13 | 4 | | | | | |
| 14 | 4 | | | | | |
| 15 | 4 | | | | | |
| 16 | 4 | | | | | |
| 17 | | | | | | |
| 18 | | | | | | |
| 19 | | | | | | |
| 20 | | | | | | |
| 21 | | | | | | |
| 22 | | | | | | |
| 23 | | | | | | |
| 24 | | | | | | |
| 25 | | | | | | |
| 26 | | | | | | |
| 27 | | | | | | |
| 28 | | | | | | |
| 29 | | | | | | |
| 30 | | | | | | |
| 31 | | | | | | |
| 32 | | | | | | |

Figure 4

| # ODPs | Number of fibres connected to ODP | | | | | |
|---|---|---|---|---|---|---|
| | 4 | 8 | 12 | 16 | 24 | 32 |
| 1 | 2 | 4 | 6 | 8 | 12 | 16 |
| 2 | 2 | 4 | 6 | 8 | 12 | 16 |
| 3 | 2 | 4 | 6 | 8 | 12 | 16 |
| 4 | 2 | 4 | 6 | 8 | 12 | 16 |
| 5 | 2 | 4 | 6 | 8 | 12 | |
| 6 | 2 | 4 | 6 | 8 | | |
| 7 | 2 | 4 | 6 | 8 | | |
| 8 | 2 | 4 | 6 | 8 | | |
| 9 | 2 | 4 | 6 | | | |
| 10 | 2 | 4 | 6 | | | |
| 11 | 2 | 4 | | | | |
| 12 | 2 | 4 | | | | |
| 13 | 2 | 4 | | | | |
| 14 | 2 | 4 | | | | |
| 15 | 2 | 4 | | | | |
| 16 | 2 | 4 | | | | |
| 17 | 2 | | | | | |
| 18 | 2 | | | | | |
| 19 | 2 | | | | | |
| 20 | 2 | | | | | |
| 21 | 2 | | | | | |
| 22 | 2 | | | | | |
| 23 | 2 | | | | | |
| 24 | 2 | | | | | |
| 25 | 2 | | | | | |
| 26 | 2 | | | | | |
| 27 | 2 | | | | | |
| 28 | 2 | | | | | |
| 29 | 2 | | | | | |
| 30 | 2 | | | | | |
| 31 | 2 | | | | | |
| 32 | 2 | | | | | |

Figure 5

METHOD FOR CONFIGURING A FTTH DISTRIBUTION NETWORK CELL

CROSS-REFERENCE TO RELATED APPLICATIONS

This application is a National Stage entry of International Application No.: PCT/IB2021/060802, filed Nov. 22, 2021, which claims priority to Portuguese Patent Application No. 116955, filed Dec. 17, 2020. The disclosures of the priority applications are hereby incorporated in their entirety by reference.

FIELD OF THE INVENTION

The present invention is enclosed in the field of network communications. Mainly, the present invention relates to methods for configuring FTTH distribution network cells.

PRIOR ART

Low density residential and SMB (Small Medium Business) areas are locations where SDUs (Single Dwelling Units) and small MDUs (Multi-Dwelling Units) are predominant, usually small/medium towns, neighbourhoods, and rural communities. In these areas, the FTTH (Fibre To The Home) network typically follows a common tree topology, formed by a CO (Central Office), a feeder network and distribution networks. A PON (Passive Optical Network) split ratio of 1:64 is usual. The first stage of splitting is located at CO (1:2 splitter), and the second stage at the entrance of the distribution network (1:32 splitter).

The CO contains the OLT (Optical Line Termination), the splitters (1:2 split ratio), and the border ODF (Optical Distribution Frames), the interface to the feeder network. The CO primary function links the OLT GPON (Generic Passive Optical Networks) active ports and the passive network termination points to light up the PONs.

The feeder network provides fibre capacity between the CO and distribution networks. It is composed of high-capacity cables departing from the CO and going across the distribution networks entry points to feed them with the planned fibres.

The distribution network consists of a ramification of low-capacity optical fibre cables spliced in strategic points to reach all distribution points (ODPs—Optical Distribution Points), where the customer drop connects. At the entry point is a splitter (OSJ—Optical Splitter Joint) that implements the point-to-multipoint function. In practice, it increases the number of fibres available from the feeder network by its split ratio. Usually, the distribution network cell is planned to cover between 128 and 192 customer dwelling units, with an OSJ composed of four 1:32 splitters. This distribution assures at least a target coverage rate of 70%.

In the distribution network cell, fibres are connected straight in sequence cable by cable from the port adapters of ODPs into the OSJ splitters outputs, starting at the first splitter, first output. This distribution means that even for low penetration rates and assuming a similar distribution of customers inside the cell, it must light up all input ports of the splitters, so both GPON ports feeding the cell must be activated and connected to the passive network entry point at the CO. Assuming the same behaviour to all cells belonging to a CO, the number of GPON ports required is the same to achieve the target coverage rate.

Problem to be Solved

For typical FTTH network topologies applied in low-density residential and SMB areas, with a typical PON split ratio of 1:64, the actual fibre connectivity method used inside the distribution network cell does not optimize network resources. CO and distribution network cell splitters need to be illuminated, even for a low customer penetration rate.

The passive part of the FTTH network, at CO and outside plant, is commonly designed and constructed to support the planned target coverage rate. Still, network operators will significantly impact the investment if the required hardware for the active equipment at CO, the OLT GPON port, would be dependent on the market demand evolution.

Additionally, if a GPON port or a distribution cell splitter fails, all customers of the same area or MDU will be affected due to the used connectivity method.

SUMMARY OF THE INVENTION

It is therefore the object of the present invention to provide a method for configuring a FTTH distribution network cell, allowing to optimize the number of required OLT GPON ports, according to the growing of customer penetration rate, when deploying FTTH in low density residential and SMB areas.

On a typical FTTH connectivity scenario, a GPON port will reach one of the OSJ splitters located at the distribution network entrance. All ODPs are usually connected straight to the outputs of that splitter. If an outage occurs at the GPON port or at a splitter of the OSJ module, the whole area (buildings) will be out-of-service. This topology on the distribution network will also require to light up all PON ports feeding the cell, even to attend to initial customers. This distribution means the network operator cannot use a pay-as-you-grow strategy at the CO, where the pieces of equipment are more expensive and sensible to deal with it.

This invention presents a new connectivity method to be used at FTTH distribution networks based on cross-connecting the fibres between ODPs and the OSJ splitters output to spread each splitter coverage across the cell. The method guarantees a fair distribution of each splitter output by as many ODPs as possible, considering a set of best practice FTTH design rules and the cell target penetration rate. Assuming that all cell potential customers have the same probability of subscribing to an FTTH service, the method assures that initial customers will be attached to the first OSJ splitter and so on as the penetration rate increases.

In this scenario, the method of the invention is applied to the number of required active GPON ports in the CO depending on the customer penetration rate evolution, and may light up PON ports progressively according to service subscriptions. Therefore, network operators can dynamically plan GPON port utilization and optimize their budget in the CO OLTs hardware investments. Simultaneously, the invention enables to minimize the number of service outages in the same area, in case of GPON port or splitter failures, due to the method used to share the splitter outputs by ODPs.

The present invention also relates to a FTTH network that includes a distribution network cell specially configured according to the method herein described.

DESCRIPTION OF FIGURES

FIG. 3 illustrates a table representing the relationship between customers and fibres connected between OSJ-ODP and FIG. 4 illustrates a table representing the number of possible customers to connect using only one PON port, crossed with the number of ODPs, in a scenario where the method of the invention is not applied.

FIG. 5 illustrates a table representing the number of possible customers to connect using only one PON port, crossed with the number of ODPs, in a scenario where the method of the invention is applied.

DETAILED DESCRIPTION

Figure 1:
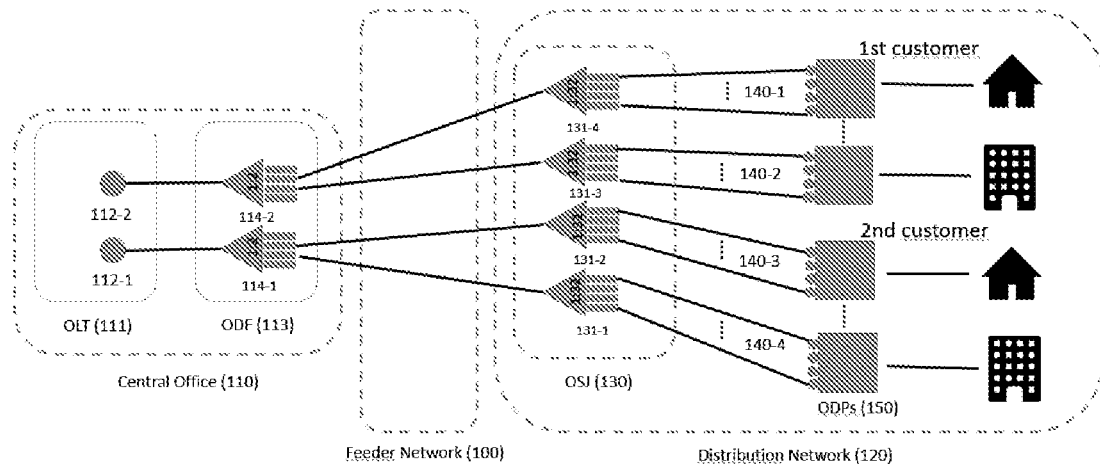
FIG. 1 illustrates a diagram representing the typical connectivity FTTH scenario.

FIG. 1 shows a typical FTTH network comprising the CO (110), the feeder network (100), the distribution (120) network and their respective elements. The CO (110) includes the OLT (111) as well as the ODF (113). This ODF usually has a 1:2 split ratio. The distribution network (120) comprises an OSJ module (130), typically comprised by splitters with a 1:32 split ratio and by several ODPs (150). The OLT PON ports (112-1, 112-2) are connected to the ODF splitters (114-1, 114-2) with patch-cords. These splitters are the feeder network border and connect through optical fibre cables to the splitters (131-1, 131-2, 131-3, 131-4) of the OSJ module (130). The connections between the splitters of the OSJ module (130) and ODPs (150) are made in a sequence order, with optical fibre cables (140-1, 140-2, 140-3, 140-4) giving service to the first and second customer. This means that when one splitter cable (140-1) of the OSJ module (130) is full, the connection goes to another one (140-2), and so on (140-3, 140-4). With this option, there is no usage optimization of the PON ports in the CO since it is mandatory to light up all the PON ports to give service to the customers. If the customers are less than 64 per PON, there will be underuse of that resources.

Figure 2:
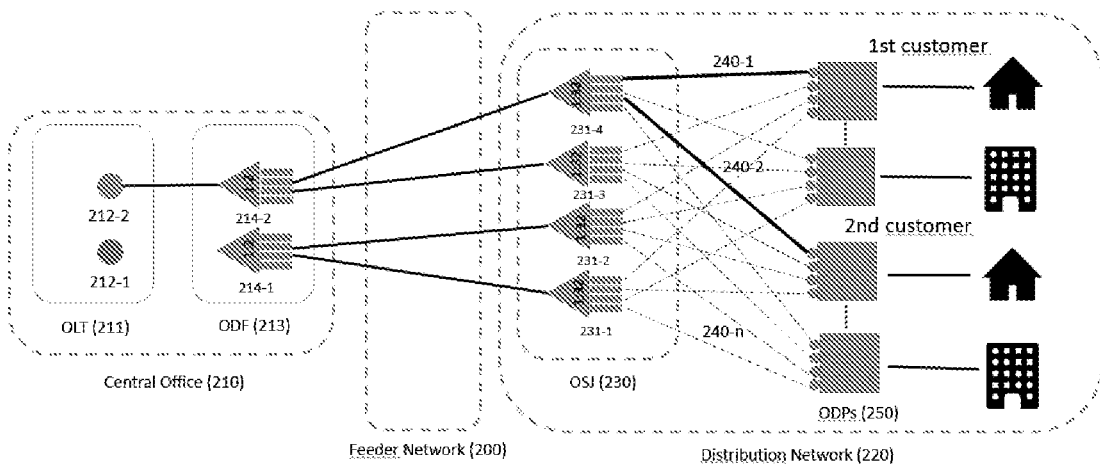
FIG. 2 illustrates a diagram representing how the connectivity is made in the FTTH distribution network according to the method of the invention.

To implement the method of the invention, as illustrated in FIG. 2, it is not required any particular feature of any kind on the fibres or the equipment that make up a regular FTTH network cell. The manufacturer or model of the equipment and cables are not relevant. Only the existence of splitters (231-1, 231-2, 231-3, 231-4) at the OSJ (230) is mandatory, as in a regular FTTH network, and split ratio must be the same in splitters present in the OSJ module (230), of the distribution network (220). The particular embodiment used to describe this invention is an FTTH network applied in residential and SMB areas.

The invention is composed of the method to connect the fibres between the OSJ splitters (231-1, 231-2, ...) and the ODPs (250).

The previous conditions that must be met for the application of the method of the invention are:

ODPs must be already created in the distribution network to feed the customer buildings, and each ODP is configured to attend a specific number of customers, $N_{PC\text{-}ODP}$;

Optical fibre cables must be already passed between the OSJ module (230) and ODPs (250)—that will guarantee that it will be possible to make fibre connections between OSJ splitters (231-1, 231-2, ...) and the ODPs (250);

The capacity of each sheath of cable (240-n), between the OSJ module (230) and the ODPs (250), must be equal or greater than the number of customers that the ODP will attend.

Given those conditions, it is possible to proceed with the method for FTTH PON optimization in low density residential and SMB areas. The connectivity of each cable and fibre between the OSJ module (230) and ODPs (250) will be done regarding the target penetration rate defined by the network operator. If the target penetration rate is 100%, the number of fibres connected will be the sum of all the potential customers to attend and the intended reserved fibres. For example, if the target penetration rate is 50%, the number of fibres connected will be half of the potential customers plus the intended reserved fibres. Other configurations can be applied as described in the table of FIG. 3.

The connection between OSJ module (230) and ODPs (250) is made with the following rule. The fibre with the lowest number (nearest to the cable central strength member) will be allocated to the farthest ODP (250). On the other hand, the fibre with the highest number (closest to the cable jacket) will be connected to the nearest ODP (250). This is done in this way since it is easier for a technician in the field to access the fibres without damaging the optical fibre cable.

To calculate the number of optical fibres, $N_{OF}$, that need to be connected to each splitter port and to use the conditions and rules described, the following formula should be applied:

$$N_{OF} = (N_{PC\text{-}ODP} \times \% \text{ of target Penetration Rate}) + N_{RF}$$

Wherein, $N_{RF}$ is the number of reserved optical fibres.

First, the method selects the fibres (240-1, 240-2, 240-n) needed to attend each ODP, starting with the nearest to the OSJ, and connect them sequentially to the ODP ports. These fibres will then be connected to the splitters (231-1, 231-2, 231-3, 231-4) ports on the OSJ side, maximizing the splitters usage using a round-robin algorithm (240-n).

In this way, it is guaranteed that for each ODP (250), the maximum possible number of splitters (231-1, 231-2, ...) is reached and it is ensured a uniform distribution. This will also assure the spread of the outputs of a splitter (231-1, 231-2, ...) to as many ODPs (250) as possible. Therefore, it will enable the network operator to provision initial customers on first splitters (231-1, 231-2, ...), which means on the first PON port. In the example, the fibres (240-1, 240-2) that give service to the first and second customer will be connected to only one PON port active (212-2) that is connected to the ODF splitter (214-2).

This provides the optimization of the PON ports (212-1, 212-2) of the OLT (211). Since using the method of the present invention, there is no need to have all the PON ports lighted up initially. Even with a complete distribution network deployed, new PON ports can be activated as the customer penetration rate grows. If the number of customers increases and a new PON Port (212-1) needs to be light up, only a new patch-cord to the splitter (214-1) of the ODF (213) needs to be connected.

With this invention, it will be possible to get more utilization per PON port, reducing the CO (210) costs, using a pay-as-you-grow strategy.

FIG. 4 and FIG. 5 show the benefits of using this invention, comparing the number of ODPs and fibres per ODP that can be used on the first PON (1:64 split ratio used) in function of the number of fibres allocated per ODP, assuming the worst case that all ODPs have the same number of fibres allocated. FIG. 4 illustrates the case where the traditional connectivity method is used, and in FIG. 5, the method of the invention herein described is applied.

As can be observed in FIG. 4, the number of ODPs is equal to the division of 64 by the number of fibres allocated per ODP due to the method of doing the connectivity straight between OSJ and ODPs. For instance, if the number of fibres connected per ODP is 8, only 6 ODPs with 8 fibres can be placed on the first PON. On the other way, using the invention (FIG. 5) with the same 8 fibres allocated per ODP, a number of 16 ODPs with 4 fibres each can use the first PON. In this case, until reaching a customer penetration rate of 50%, only one PON is needed to cover the whole distribution network. The invented method spreads the PON port by the ODPs of the distribution network, unlike the previous method, which requires both PON ports, even for low penetration rates. FIG. 5 also shows the importance of the method for low density residential and SMB areas because as much as low is the number of fibres allocated per ODPs, more ODPs can be covered by the first PON. Even for the case of having 32 fibres allocated to the ODPs, only the 17th customer of an ODP requires a new PON port to be light up.

Description of the Embodiments

The following description is presented to enable any person skilled in the art to build and use the invention. Various modifications to the disclosed embodiments will be readily apparent to those skilled in the art. The general principles defined herein may be applied to other embodiments and applications without departing from the scope of the present invention. Thus, the present invention is not intended to be limited to the embodiments shown.

In one embodiment of the invention, a method for configuring a FTTH distribution network cell is provided, in order to optimizing FTTH PON networks in low density residential and SMB areas, namely the utilization of OLT GPON ports at a Central Office and the minimization of simultaneous services failures in the same zone, inside a distribution network cell.

The method, it is used to perform an end-to-end connectivity inside an FTTH distribution network cell between the ODP (250) ports, where the customer drop connects to, and the outputs of the splitters (231-1, 231-2, . . . ), implemented in a way that fibres assigned to each ODP (250) are distributed by all OSJ splitters (231-1, 231-2, . . . ) using, for example, a round-robin algorithm, wherein the OSJ module (230) is unique inside the distribution network cell (220), i.e. all OSJ splitters belong to the same OSJ module (230), have all the same split ratio.

The method also involves calculating the number of fibres assigned to an ODP (250), wherein the number of fibres $N_{of}$ is as follows:

$$N_{OF} = (N_{PC\text{-}ODP} \times \% \text{ of target Penetration Rate}) + N_{RF}$$

Where $N_{RF}$ is the number of reserved optical fibres for an ODP and $N_{PC\text{-}ODP}$ is the number of customers that an ODP is configured to attend.

The criteria to choose the fibres to assign to an ODP (250), establishes that for each cable terminated at the output side of the OSJ module (230), fibres with the lowest numbers (nearest to the cable central strength member) are allocated to the farthest ODP (250) and fibres with the highest numbers (closest to the cable jacket) are allocated to the nearest ODP (250).

Additionally, in one embodiment of the method, the fibres allocated to an ODP (250) are connected with the following rule:
- at ODP (250) side, fibres are connected straight to the ODP (250) ports, in sequence from the lowest to the highest fibre number;
- at OSJ module (230) side, starting with the lowest fibre and connecting it to the lowest free output of the lowest loaded splitter (231-1, 231-2, . . . ), then going to the next lowest fibre and connecting it to the lowest free output of the next splitter (231-1, 231-2, . . . ), and so on;

In another embodiment of the method, the ODPs (250) are organized in a list from the nearest of the OSJ module (230) to the farthest, in a way that the position in the list depends on the distance taken by the cable to reach the ODP (250).

The present invention also relates to a FTTH network, comprising a Central Office (210), including at least one OLT (211) and at least one ODF (213) a Distribution Network cell (220) comprising an OSJ module (230) including a plurality of splitters (231-1, 231-2, . . . ) with an equal split ratio; each splitter being connected to the at least on ODF (213) of the Central Office (210); and at least one ODP (250) configured to attend a potential number of customers, $N_{PC\text{-}ODP}$. The FTTH network being characterized in that, each ODP (250) being connected to the splitters (231-1, 231-2, . . . ) of the OSJ module (230) by means of fibre optic cables, and according to the method of configuring a FTTH distribution network cell of the invention.

In one embodiment of the system, the capacity of each sheath of the fibre optic cable connecting the at least one ODP (250) to the splitters (231-1, 231-2, . . . ) of the OSJ module (230) is equal or greater than the number of customers that the ODP (250) is configured to attend.

The invention claimed is:
1. Method for configuring a FTTH distribution network cell characterized by comprising the following steps:
   i. Connecting ODPs, configured to attend $N_{PC\text{-}ODP}$ number of customers, to splitters of a OSJ module having the same split ratio, by means of fibre optical cables;
   ii. Assign a number of optical fibres, $N_{OF}$, to each ODP, is as follows:

$$N_{OF} = (N_{PC\text{-}ODP} \times \% \text{ of target Penetration Rate}) + N_{RF}$$

Where $N_{RF}$ is the number of reserved optical fibres for an ODP;
   iii. For each optical fibre cable terminated at the output side of the OSJ module:
   allocate fibres with the lowest numbers—nearest to the fibre optic cable's central strength member to the farthest ODP relative to the OSJ module; and
   allocate fibres with the highest numbers—closest to the fibre optic cable's jacket-to the nearest ODP.

2. Method according to claim 1, wherein fibres assigned to each ODP are distributed by all splitters of the OSJ module by means of implementing a round-robin algorithm.

3. Method according to claim 1, wherein the fibres allocated to an ODP are connected as follows:
   at the ODP side, fibres are connected straight to the ODP ports, in sequence from the lowest to the highest fibre number;
   at the OSJ side, by sequentially connecting the fibre with the lowest number to the lowest free output of the lowest loaded splitter.

4. Method according to claim 1, wherein the ODPs are registered in a list, being organized from the nearest of the OSJ module to the farthest, in a way that the position in the list depends on the distance taken by the fibre optical cable to reach the ODP.

5. A FTTH network, comprising:

A Central Office comprising at least one OLT and at least one ODF;

A Distribution Network cell comprising:

an OSJ module including a plurality of splitters with an equal split ratio; each splitter being connected to the at least on ODF of the Central Office; and at least one ODP configured to attend a specific number of customers, $N_{PC\text{-}ODP}$; characterized in that, each ODP being connected to the splitters of the OSJ module by means of fibre optic cables, according to the method of claim 1.

6. System according to claim 5 wherein the capacity of each sheath of the fibre optic cable connecting the at least one ODP to the splitters of the OSJ module is equal or greater than the number of customers that the ODP is configured to attend.

* * * * *